US008081661B2

(12) United States Patent
Yoo et al.

(10) Patent No.: US 8,081,661 B2
(45) Date of Patent: Dec. 20, 2011

(54) DYNAMIC BANDWIDTH ALLOCATION DEVICE FOR AN OPTICAL NETWORK AND METHOD THEREOF

(75) Inventors: Hark Yoo, Gwangju (KR); Bin-Yeong Yoon, Daejeon (KR); Kyeong-Hwan Doo, Daejeon (KR); Kwang-Ok Kim, Jeonju (KR); Sung-Chang Kim, Gwangju (KR); Mun-Seob Lee, Gwangju (KR); Bong-Tae Kim, Daejeon (KR); Man-Soo Han, Jeollanam-do (KR)

(73) Assignee: Electronics and Telecommunications Research Institute (KR)

( * ) Notice: Subject to any disclaimer, the term of this patent is extended or adjusted under 35 U.S.C. 154(b) by 247 days.

(21) Appl. No.: 12/442,809

(22) PCT Filed: Sep. 28, 2007

(86) PCT No.: PCT/KR2007/004737
§ 371 (c)(1),
(2), (4) Date: Mar. 25, 2009

(87) PCT Pub. No.: WO2008/039014
PCT Pub. Date: Apr. 3, 2008

(65) Prior Publication Data
US 2010/0008379 A1  Jan. 14, 2010

(30) Foreign Application Priority Data

Sep. 29, 2006  (KR) .................. 10-2006-0096587

(51) Int. Cl.
*H04J 3/16* (2006.01)
(52) U.S. Cl. ....................................... 370/468
(58) Field of Classification Search .......... 370/252–254, 370/395.21, 395.4–395.43, 468, 477
See application file for complete search history.

(56) References Cited

U.S. PATENT DOCUMENTS

2002/0131413 A1* 9/2002 Tsao et al. .................. 370/392
(Continued)

FOREIGN PATENT DOCUMENTS

JP  2002-300180  10/2002
(Continued)

OTHER PUBLICATIONS

An, F.-T., et al., "A New Dynamic Bandwidth Allocation Protocol with Quality of Service in Ethernet-based Passive Optical Networks," Proc. International Conference on Wireless and Optical Communication, Banff, Canada (Jul. 2003) 5 pages.
(Continued)

*Primary Examiner* — Kwang B Yao
*Assistant Examiner* — Tung Q Tran
(74) *Attorney, Agent, or Firm* — Blakely, Sokoloff, Taylor & Zafman

(57) ABSTRACT

A dynamic bandwidth allocation (DBA) device and a method thereof are provided. In the DBA method, the band allocation periods according to class queues and allocable bands with respect to each class queue are calculated on the basis of the service level agreement information and stored according to the service types in separate tables. The bandwidth allocation amount is calculated with respect to class queues which have the allocation periods by concurrently checking all the tables at each frame. The upward bandwidth usage efficiency is improved by calculating the final bandwidth allocation information from the service with a high priority order on the basis of the total allocable bandwidth of the corresponding frame. The upward bandwidth allocation amount can be calculated at each frame by reducing the processing speed in calculating the bandwidth allocation amount of each class queue. Accordingly, it is possible to effectively use the network.

13 Claims, 3 Drawing Sheets

U.S. PATENT DOCUMENTS

| | | | |
|---|---|---|---|
| 2003/0133466 A1* | 7/2003 | Shimonishi | 370/412 |
| 2003/0179769 A1* | 9/2003 | Shi et al. | 370/442 |
| 2004/0252714 A1 | 12/2004 | Oh et al. | |
| 2004/0258094 A1* | 12/2004 | Bashan et al. | 370/486 |
| 2006/0233197 A1* | 10/2006 | Elmoalem et al. | 370/468 |
| 2007/0064731 A1* | 3/2007 | Mizutani et al. | 370/468 |
| 2007/0133409 A1* | 6/2007 | McKinnon et al. | 370/230 |

FOREIGN PATENT DOCUMENTS

| | | |
|---|---|---|
| JP | 2003-229877 | 8/2003 |
| KR | 2003-0043175 | 6/2003 |
| KR | 2003-0073472 | 9/2003 |
| KR | 10-2005-0118390 | 12/2005 |
| KR | 10-2006-0028043 | 3/2006 |

OTHER PUBLICATIONS

Leligou, H.C., et al., "Effficient medium arbitration of FSAN-compliant GPONs," International Journal of Communication Systems (in press), (2005) 15 pages.

* cited by examiner

DYNAMIC BANDWIDTH ALLOCATION DEVICE FOR AN OPTICAL NETWORK AND METHOD THEREOF

CROSS-REFERENCE TO RELATED PATENT APPLICATION

The present patent application is a national phase application of International Application No. PCT/KR2007/004737, filed Sep. 28, 2007, which application claims the benefit of Korean Patent Application No. 10-2006-0096587, filed on Sep. 29, 2006, in the Korean Intellectual Property Office, the disclosure of which is incorporated herein in its entirety by reference.

BACKGROUND OF THE INVENTION

1. Field of the Invention

The present invention relates to a dynamic bandwidth allocation device for an optical network and a method thereof.

2. Description of the Related Art

A passive optical network (hereinafter, referred to as a PON) technique is a type of Fiber To The Home technique (FTTH) suggested for effectively providing a bandwidth needed for a subscriber end, and has a point-to-multipoint network structure in which a plurality of optical network units (ONUs) share an optical line terminal (OLT) through a passive element.

An optical distribution network is a transmission network between the OLT and the ONUs which is constructed as a tree structure. An asynchronous transfer mode PON (ATM-PON), an Ethernet PON (E-PON), and a Gigabit PON (G-PON) are standardized by the ITU-T and the IEEE as the FTTH network having a PON structure.

FIG. 1 illustrates a general structure of a passive optical network.

As shown in FIG. 1, the PON has a tree structure having a 1-to-N correspondence between an OLT 101 and a plurality of ONUs 102 to 104 through a passive element. In a downward transmission from the OLT 101 to the ONUs 102 to 104, since data transmitted from the OLT 101 is broadcasted to all the ONUs 102 to 104, a problem caused by sharing a medium does not occur. On the other hand, in a upward transmission from the ONUs 102 to 104 to the OLT 101, since a plurality of ONUs 102 to 104 are connected to the OLT 101 through an optical fiber connected to the passive element, a time division multiple access medium access control (TDMA MAC) protocol which avoids temporal duplication and accesses a medium is needed.

In particular, in a GPON standardized by the ITU-T, data transmitted upward is stored and transmitted as a plurality of transmission containers (T-CONTs) using a class queue according to service classes so that the ONUs may receive various types of traffic. The OLT gathers wait state information of all the T-CONTs operating in a link and allocates an upward bandwidth according to the T-CONTs on the basis on the wait state information.

In addition, in the GPON, downward frames are transmitted in units of fixed short frames of 125 us so as to support a voice service having strict time delay conditions. In the downward frames, each ONU is instructed to transmit data of upward 125 us frames so as to perform downward data transmission. Accordingly, in order to improve network efficiency and secure transmission quality, a dynamic bandwidth allocation method of calculating an upward bandwidth of each T-CONT at each frame on the basis of a service level agreement (hereinafter, referred to as SLA) information of each T-CONT and wait state information is needed.

The simplest method of allocating an upward bandwidth is a method of allocating a fixed bandwidth by using an allocation period and an allocation amount calculated by the SLA with respect to each T-CONT regardless of wait state information. However, in this method, even when there is no data waiting for upward transmission with respect to each T-CONT, a bandwidth is allocated, and therefore unnecessary bandwidth waste occurs.

FIG. 2 is a block diagram illustrating a device corresponding to a dynamic bandwidth allocation method according to an existing technique.

In a research paper entitled as "Efficient medium arbitration of FSAN-compliant GPONs", International Journal of Communication Systems, Volume 19, Issue 5, pp. 603-617, as shown in FIG. 2, bandwidth allocation periods of T-CONTs calculated on the basis of an SLA and an allocable bandwidth amount are represented as a table (SLA parameter table) 201, and timers (timers for guaranteed service) 202 for checking an allocation period of the T-CONTs corresponding to a guaranteed bandwidth service and timers (timers for non-guaranteed service) 203 for checking allocation periods of the T-CONTs corresponding to non-guaranteed bandwidth service are disclosed.

The bandwidth allocation amounts are calculated by comparing the allocable bandwidth amounts, which is calculated on the basis of the SLA with respect to the allocation periods of T-CONTs, with the wait state information (report table 204) of the corresponding T-CONTs (allocation unit 205). After all the bandwidth allocation amounts of the T-CONTs corresponding to the guaranteed bandwidth service are calculated, when the upward bandwidth amount still remains, the bandwidth allocation amounts are calculated with respect to the T-CONTs having the corresponding allocation period among the T-CONTs corresponding to the non-guaranteed bandwidth service.

When this method is used, since the wait state information of the T-CONTs is used for the upward bandwidth allocation, more efficient bandwidth allocation can be obtained compared with a method of allocating the fixed bandwidth. However, since the timers are sequentially checked so as to determine whether the allocation period of each T-CONT has been reached, the processing time needed for allocating the bandwidth increases proportionally with the number of the T-CONTs.

As described in the aforementioned existing technique, the advantage of using a fixed bandwidth allocation method is that a processing time needed for the dynamic bandwidth assignment (hereinafter, referred to as DBA) operation is very short, since the bandwidth is fixed. On the other hand, when the fixed bandwidth is allocated regardless of the wait state of each T-CONT the disadvantage is that the upward bandwidth cannot be effectively used.

In addition, when the upward wait state information of each T-CONT is used, and the bandwidth allocation period of the T-CONTs is sequentially checked in descending order of service levels, the number of the total T-CONTs increases, and accordingly the processing time increases. Therefore, it is difficult to satisfy a request of GPON DBA for calculating the upward bandwidth allocation amount at each frame.

SUMMARY OF THE INVENTION

The present invention provides a dynamic bandwidth allocation device capable of improving usage efficiency of upward bandwidth by using service level agreement (SLA)

information and wait state information of T-CONTs and capable of calculating an upward bandwidth allocation amount at each frame by reducing a processing speed in calculating bandwidth allocation amounts of T-CONTs and a method thereof.

The present invention also provides a computer-readable recording medium having embodied thereon a computer program for executing the dynamic bandwidth allocation method for an optical network.

According to an aspect of the present invention, there is provided a dynamic bandwidth allocation device comprising: a service level agreement (SLA) parameter table storing a band allocation period and allocation amount information of each class queue calculated on the basis of SLA information; an allocation check table storing information used for checking band allocation periods of class queues according to the service types of the class queues on the basis of the information stored in the SLA parameter table and determining the band allocation amount; a bandwidth allocation unit checking an allocation period at each frame by using the information stored in the allocation check table and calculating the bandwidth allocation amounts of the class queues which have the allocation periods; and a final bandwidth allocation unit recording the band allocation amount of each class queue calculated by the band allocation unit in real time, calculating the total bandwidth usage amount in real time in consideration of factors including frame overhead, and finally allocating an upward bandwidth with respect to each class queue by comparing the total bandwidth usage amount with the total upward bandwidth value.

In the above aspect of the present invention, the dynamic bandwidth allocation device may further include: a report table gathering and storing current wait state information of the class queues so as to correspond to the information stored in the allocation check table; and a report update unit modifying the report table of each class queue by using the bandwidth allocation amount allocated to each class queue at each frame and gathering wait state information.

In addition, the SLA parameter table may store the bandwidth allocation period and allocable band amount calculated so as to satisfy quality of service agreed on with respect to each Class queue on the basis of SLA information. When only a guaranteed bandwidth allocation period is provided according to types of class queues, the SLA parameter table may store one bandwidth allocation period and one band allocation amount, and when a class queue provides a guaranteed bandwidth service and a non-guaranteed bandwidth service, the SLA parameter table may store two bandwidth allocation periods and two band allocation amounts.

In addition, the allocation check table may separately store the allocation period and the allocable band amount according to the types of the class queues by using information in the SLA parameter table. A criterion for classifying the types of class queues may include the service class provided by each class queue and whether the bandwidth of the service is guaranteed or not. When the class queue provides the guaranteed bandwidth service and the non-guaranteed bandwidth service, the bandwidth allocation period and allocation amount information corresponding to the guaranteed bandwidth service, and the bandwidth allocation period and allocation amount information corresponding to the non-guaranteed bandwidth service are recorded in separate tables.

In addition, the allocation period information of the allocation check table may be stored as timer information and updated by the band allocation unit, which calculates the bandwidth allocation amount by using the allocation period information when the time has expired according to the timer information.

In addition, the bandwidth allocation unit updates the allocation period timer information according to tables corresponding to the class queues at each frame and calculates the band allocation amount with respect to the class queue for which the timer has expired. The bandwidth allocation unit may concurrently perform an allocation period checking operation and an allocation amount calculation operation with respect to all the tables corresponding to the class queues. The bandwidth allocation unit may sequentially perform a checking operation from the first class queue to the last class queue with respect to the allocation checking table corresponding to the class queue types and compare the bandwidth allocation amount with wait state information stored in the report table by using wait state information of the class queue corresponding to the report table and determines the smaller value to be the allocation amount.

In addition, when the allocation check table includes a plurality of tables corresponding to class queues by storing information according to the class queues, the bandwidth allocation unit includes a plurality of sub allocation units allocating bands according to the class queues in one-to-one correspondence with the plurality of tables. The bandwidth allocation unit may check the allocation period in a round robin method by using a timer. Also, the bandwidth allocation unit may check the allocation period in a deficit round robin method by using a deficit counter.

In addition, the final bandwidth allocation unit may calculate the allocable total bandwidth of the upward frame when the allocation checking operation with respect to all the tables is completed. When a value obtained by summing up total band allocation amounts of tables which are calculated by using the allocation check tables corresponding to the class queues stored in the allocation check table exceeds a total allocable bandwidth, the final bandwidth allocation unit may re-calculate the allocation amount of only the corresponding allocation check table so as not to exceed the total allocable bandwidth, and when the total band allocation amount does not exceed the total allocable bandwidth, the final bandwidth allocation unit may perform the upward bandwidth allocation with respect to each class queue by using the total band allocation amount calculated by the allocation check table.

According to another aspect of the present invention, there is provided a dynamic bandwidth allocation method for an optical network, the method comprising: (a) storing a band allocation period and allocation amount information of each class queue calculated on the basis of service level agreement information; (b) checking band allocation periods of the class queues according to service types of the class queues on the basis of the stored information and storing information used to determine the band allocation amount; (c) checking an allocation period at each frame by using the information stored in (b) and calculating bandwidth allocation amounts of class queues which have the allocation periods; and (d) recording the band allocation amounts of each class queue calculated in (c) in real time, calculating total bandwidth usage amount in real time in consideration of factors including frame overhead, comparing the total bandwidth usage amount with the total upward bandwidth value, and finally allocating the upward bandwidth with respect to each class queue.

In the above aspect of the present invention, the dynamic bandwidth allocation method may further comprise: (e) gathering and storing current wait state information of the class queues so as to correspond to the information stored in (b);

and (f) modifying specifications stored in (e) of each class queue by using the bandwidth allocation amount allocated to each class queue at each frame and the gathered wait state information.

According to another aspect of the present invention, there is provided a computer-readable recording medium having embodied thereon a computer program for executing a dynamic bandwidth allocation method for an optical network, the method comprising: (a) storing a band allocation period of each class queue and allocation amount information calculated on the basis of SLA information; (b) checking a band allocation period of the class queues according to service types of the class queues on the basis of the stored information and storing information used to determine the band allocation amount; (c) checking an allocation period at each frame by using the information stored in (b) and calculating bandwidth allocation amounts of the class queues which have the allocation periods; and (d) recording the band allocation amount of each class queue calculated in real time in (c), calculating total bandwidth usage amount in real time in consideration of factors including frame overhead, and finally allocating upward bandwidth with respect to each class queue by comparing the total bandwidth usage amount with the total upward bandwidth value.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, preferred embodiments of the present invention will be described in detail with reference to the attached drawings.

Figure 1:
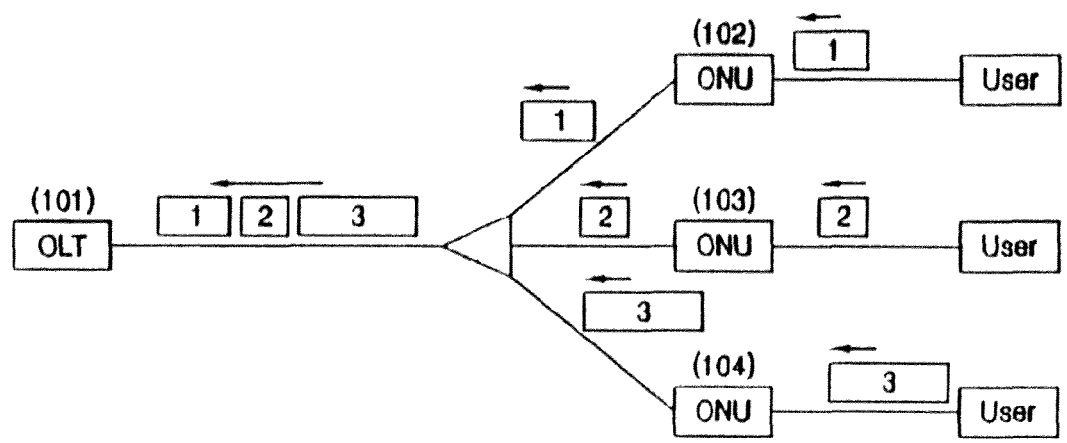
FIG. 1 illustrates a general structure of a passive optical network.
Figure 2:
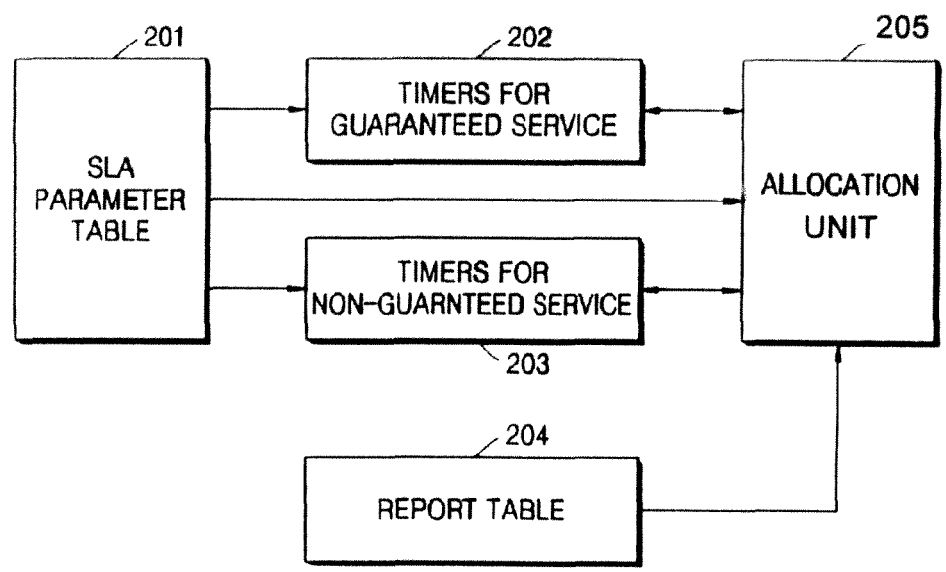
FIG. 2 is a block diagram illustrating an apparatus corresponding to a dynamic bandwidth allocation method according to an existing technique.
Figure 3:
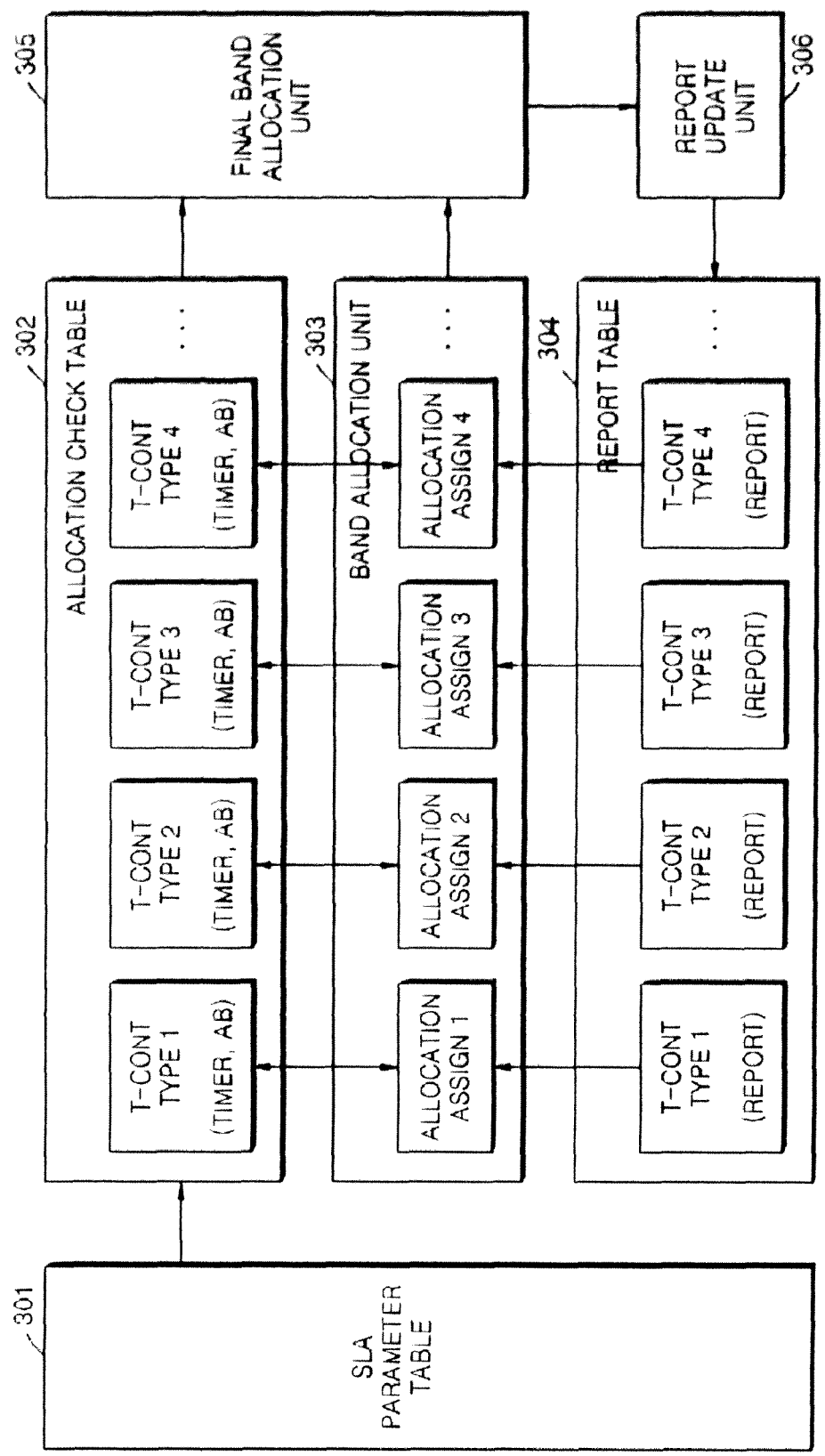
FIG. 3 is a block diagram illustrating a dynamic bandwidth allocation device for an optical network according to an embodiment of the present invention.

FIG. 3 is a block diagram illustrating a dynamic bandwidth assignment (DBA) device for an optical network according to an embodiment of the present invention.

The DBA device according to an embodiment of the present invention includes an SLA parameter table 301 which is disposed in a hardware unit of an optical line terminal (OLT) system and stores band allocation periods of T-CONTs that are class queues calculated on the basis of the SLA information, an allocation check table 302 which checks the band allocation periods of the class queues according to service types of T-CONTs on the basis of the information stored in the SLA parameter table 301 and stores information used to determine the band allocation amount, a bandwidth allocation unit 303 which checks an allocation period at each frame by using the information stored in the allocation check table 302 and calculates bandwidth allocation amounts of the class queues which are allocation periods, a final allocation unit 305 which records the band allocation amount of each class queue calculated by the band allocation unit 303 in real time, calculates total bandwidth usage amount in real time in consideration of factors including frame overhead, and finally allocates an upward bandwidth with respect to each class queue by comparing the total bandwidth usage amount with the total upward bandwidth value, a report table 304 which gathers and stores current wait state information of the class queues so as to correspond to the information stored in the allocation check table 302, and a report update unit 306 which modifies the report table 304 of each class queue by using the bandwidth allocation amount allocated to each class queue at each frame and the gathered wait state information.

Sub band allocation units (Allocation units 1 to 4) correspond one-to-one with class queue types (T-CONT types 1 to 4) of the allocation check table 302. The class queue types (T-CONT types 1 to 4) correspond one-to-one with reports (T-CONT types 1 to 4 (Report)) according to types of the report table 304.

Figure 4:
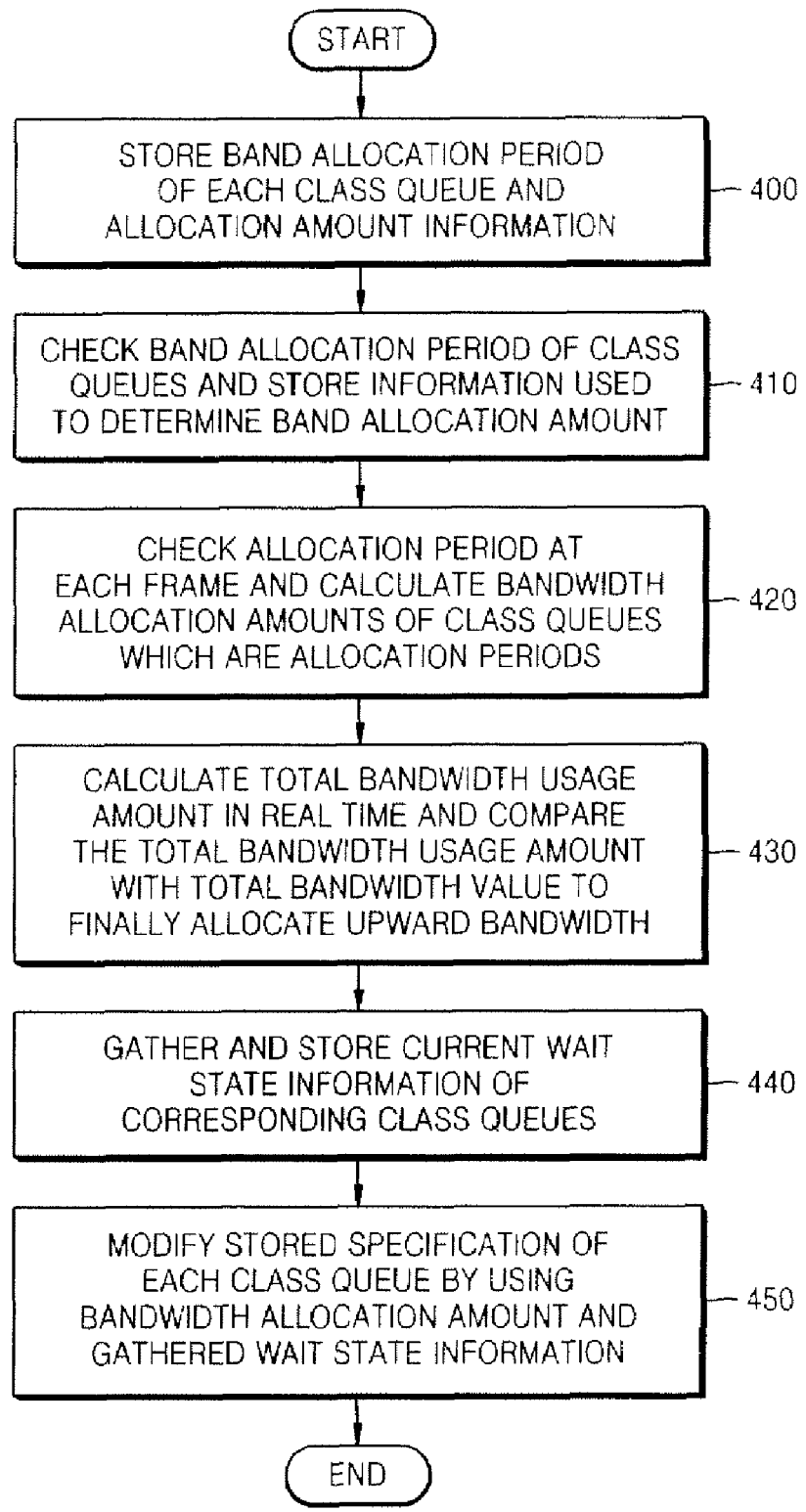
FIG. 4 is a flowchart illustrating a dynamic bandwidth allocation method for an optical network according to an embodiment of the present invention.

FIG. 4 is a flowchart illustrating a dynamic bandwidth allocation method for an optical network according to an embodiment of the present invention.

A band allocation period and allocation amount information of each class queue calculated on the basis of SLA information are stored (operation 400), a band allocation period of the class queues according to service types of class queues on the basis of the stored information is checked, information used for determining band allocation amount is stored (operation 410), an allocation period is checked by using the information stored in operation 410 at each frame, and the bandwidth allocation amounts of the class queues which have the allocation periods are calculated (operation 420), the band allocation amounts of class queues calculated in operation 420 are recorded in real time, total bandwidth usage amount is calculated in real time in consideration of factors including frame overhead, and an upward bandwidth with respect to each class queue is finally allocated by comparing the total bandwidth usage amount with the total upward bandwidth value (operation 430).

Then, current wait state information of the class queues is gathered and stored so as to correspond to the information stored in operation 410 (operation 440), and specifications stored in operation 440 of each class queue are modified and updated by using the bandwidth allocation amount allocated to each class queue at each frame and the gathered wait state information (operation 450).

Hereinafter, components of the DBA device according to the embodiment of the present invention will be described in detail. The DBA device of FIG. 3 and the DBA method of FIG. 4 will be also described.

The SLA parameter table 301 records the bandwidth allocation period and the allocable band amount calculated so as to satisfy quality of service (QoS) agreed on with respect to each T-CONT on the basis of the SLA. At this time, when only the guaranteed bandwidth service is provided according to the T-CONT types, one bandwidth allocation period and one band allocation amount are recorded. When T-CONT provides the guaranteed bandwidth service and non-guaranteed bandwidth service, two bandwidth allocation periods and two band allocation amounts are recorded.

The allocation check table 302 records the allocation periods and the allocable band amounts of the T-CONTs according to the T-CONT types by using the information in the SLA parameter table 301. At this time, a criterion for classifying the T-CONT types includes the service class provided by the T-CONT and whether the bandwidth of the service is guaranteed or not. That is, if the T-CONT provides the guaranteed bandwidth service and the non-guaranteed bandwidth service, the bandwidth allocation period and allocation amount information corresponding to the guaranteed bandwidth service, and the bandwidth allocation period and allocation amount information corresponding to the non-guaranteed bandwidth service are recorded in separate tables.

The allocation period information is stored as the timer information and updated by the band allocation unit 303 at each frame. The bandwidth allocation amount can be calculated when the allocation period information has expired.

The band allocation unit 303 updates the allocation period timer information with respect to the T-CONTs belonging to the corresponding table according to the tables at each frame and calculates the band allocation amount with respect to the T-CONTs for which timers have expired. At this time, the allocation period checking operation and the allocation amount calculating operation are concurrently performed with respect to all the tables instead of sequentially being performed from the table with the highest priority order. The allocation period checking operation of the allocation check table according to the T-CONT types is sequentially performed from the first T-CONT of the table to the last T-CONT of the table. When the bandwidth allocation amount is calculated, the wait state information of the corresponding T-CONT of the report table unit 304 is used. The allocable bandwidth allocation amount is compared with the wait state information of the report table 304, and the smaller value is determined to be the allocation value.

When the allocation checking operation with respect to all the tables is completed, the final band allocation unit 305 calculates the total allocable bandwidth (frame byte) of the upward frame in consideration of the overhead. Then, the total band allocation amounts of the tables, which are calculated by using the tables of the allocation check table unit 302, are summed up from the value of the table having a high priority order. It is checked whether the value exceeds the frame byte. When the value exceeds the frame byte, only the allocation amount of the corresponding allocation check table is calculated again so as not to exceed the frame byte. When the total band allocation amount of the allocation check table does not exceed the frame byte, the upward bandwidth allocation operation with respect to each T-CONT is performed by using the allocation amount calculated by the allocation check table unit.

The present invention may be executed as follows.

The allocation period information of the allocation check table 302 may be stored in a deficit counter. In the band allocator 303, a table may be checked by using a deficit round robin method and the allocation amount may be calculated. At this time, the deficit counter value is determined to be the maximum allocable band amount of the corresponding T-CONT at each allocation period. The deficit counter value is compared with the wait state information of the corresponding T-CONT. The smaller value is allocated as the allocation amount. The deficit counter value is reduced by the allocated amount. When the deficit counter value is 0, the band allocation amount is not calculated any more with respect to the T-CONT. A reduced access delay and a delay time variation can be provided with respect to the service with a high priority order by using the deficit round robin method.

The present invention provides an effective DBA method. In the DBA method, the band allocation periods according to class queues and allocable bands with respect to each class queue are calculated on the basis of the SLA information and stored according to the service types in separate tables. The bandwidth allocation amount is calculated with respect to class queues which have the allocation periods by concurrently checking all the tables at each frame. The upward bandwidth usage efficiency is improved by calculating the final bandwidth allocation information from the service with a high priority order on the basis of the total allocable bandwidth of the frame. The upward bandwidth allocation amount can be calculated at each frame by reducing the processing speed in calculating the bandwidth allocation amount of each class queue. Accordingly, it is possible to effectively use the network.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. The examples included in the aforementioned description are introduced so as to understand the invention, but the examples do not limit the spirit and scope of the invention. For example, although a communication network is mainly exemplified in the above description, a public telephone communication network such as a PSTN may used. It will be clearly understood by those skilled in the art that various changes in form and details may be made therein. Therefore, the scope of the invention is defined not by the detailed description of the invention but by the appended claims, and all differences within the scope will be construed as being included in the present invention.

In addition, it will be easily understood by those skilled in the art that each operation according to an embodiment of the present invention can be variously embodied as software or hardware by using a general programming technique.

Steps of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The present invention may be applied to a DBA device for an optical network in a network and an application fields thereof.

What is claimed is:

1. A dynamic bandwidth allocation device comprising:
 a service level agreement (SLA) parameter table storing a band allocation period and allocation amount information of each class queue calculated on the basis of SLA information;
 an allocation check table storing information used for checking band allocation periods of class queues according to the service types of the class queues on the basis of the information stored in the SLA parameter table and determining the band allocation amount;
 a bandwidth allocation unit checking an allocation period at each frame by using the information stored in the allocation check table and calculating the bandwidth allocation amounts of the class queues which have the allocation periods;
 a final bandwidth allocation unit recording the band allocation amount of each class queue calculated by the band allocation unit in real time, calculating the total bandwidth usage amount in real time in consideration of factors including frame overhead, and finally allocating an upward bandwidth with respect to each class queue by comparing the total bandwidth usage amount with the total upward bandwidth value;

wherein the bandwidth allocation unit updates the allocation period timer information according to tables corresponding to the class queues at each frame and calculates the band allocation amount with respect to the class queue for which the timer has expired;

wherein the bandwidth allocation unit concurrently performs an allocation period checking operation and an allocation amount calculation operation with respect to all the tables corresponding to the class queues; and wherein the bandwidth allocation unit sequentially performs a checking operation from a first class queue to a last class queue with respect to the allocation checking table corresponding to the class queue types and compares the bandwidth allocation amount with wait state information stored in a resort table by using wait state information of the class queue corresponding to the report table and determines the smaller value to be the allocation amount.

2. The dynamic bandwidth allocation device of claim 1 further comprising:

a report table gathering and storing current wait state information of the class queues so as to correspond to the information stored in the allocation check table; and a report update unit modifying the report table of each class queue by using the bandwidth allocation amount allocated to each class queue at each frame and the gathered wait state information.

3. The dynamic bandwidth allocation device of claim 1, wherein the SLA parameter table stores the bandwidth allocation period and an allocable band amount calculated so as to satisfy QoS (quality of service) agreed on with respect to each Class queue on the basis of SLA information.

4. The dynamic bandwidth allocation device of claim 3, wherein when only a guaranteed bandwidth allocation period is provided according to types of class queues, the SLA parameter table stores one bandwidth allocation period and one allocable band allocation amount, and when a class queue provides the guaranteed bandwidth service and the non-guaranteed bandwidth service, the SLA parameter table stores two bandwidth allocation periods and two band allocation amounts.

5. The dynamic bandwidth allocation device of claim 1, wherein the allocation check table separately stores the allocation period and the allocable band amount according to the types of the class queues by using information in the SLA parameter table.

6. The dynamic bandwidth allocation device of claim 5, wherein a criterion for classifying the types of the class queues includes the service class provided by each class queue and whether the bandwidth of the service is guaranteed or not.

7. The dynamic bandwidth allocation device of claim 6, wherein when the class queue provides the guaranteed bandwidth service and the non-guaranteed bandwidth service, the bandwidth allocation period and allocation amount information corresponding to the guaranteed bandwidth service, and the bandwidth allocation period and the allocation amount information corresponding to the non-guaranteed bandwidth service are recorded in separate tables.

8. The dynamic bandwidth allocation device of claim 1, wherein the allocation period information of the allocation check table is stored as timer information and updated by the bandwidth allocation unit, and the band allocation unit calculates the bandwidth allocation amount by using the allocation period information when the time has expired according to the timer information.

9. The dynamic bandwidth allocation device of claim 1, wherein when the allocation check table includes a plurality of tables corresponding to class queues by storing information according to the class queues, the bandwidth allocation unit includes a plurality of sub allocation units allocating bands according to the class queues in one-to-one correspondence with the plurality of tables.

10. The dynamic bandwidth allocation device of claim 1 or 9, wherein the bandwidth allocation unit checks the allocation period in a round robin method by using a timer.

11. The dynamic bandwidth allocation device of claim 1 or 9, wherein the bandwidth allocation unit checks the allocation period in a deficit round robin method by using a deficit counter.

12. The dynamic bandwidth allocation device of claim 1, wherein the final bandwidth allocation unit calculates the allocable total bandwidth of the upward frame when the allocation checking operation with respect to all the tables is completed.

13. The dynamic bandwidth allocation device of claim 12, wherein when a value obtained by summing up total band allocation amounts of the tables from the value of the table having a high priority order, and total band allocation amounts of the tables are calculated by using the allocation check tables corresponding to the class queues stored in the allocation check table exceeds a total allocable bandwidth, the final bandwidth allocation unit re-calculates only the allocation amount of the corresponding allocation check table so as not to exceed the total allocable bandwidth, and when the total band allocation amount does not exceed the total allocable bandwidth, the final bandwidth allocation unit performs the upward bandwidth allocation with respect to each class queue by using the total band allocation amount calculated by the allocation check table.

* * * * *